(12) United States Patent
Osawa

(10) Patent No.: US 9,291,983 B2
(45) Date of Patent: Mar. 22, 2016

(54) IMAGE FORMING APPARATUS, CONTROL METHOD AND PROGRAM

(71) Applicant: CANON KABUSHIKI KAISHA, Tokyo (JP)

(72) Inventor: Takaharu Osawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/418,069

(22) PCT Filed: Aug. 29, 2013

(86) PCT No.: PCT/JP2013/073856
§ 371 (c)(1),
(2) Date: Jan. 28, 2015

(87) PCT Pub. No.: WO2014/054373
PCT Pub. Date: Apr. 10, 2014

(65) Prior Publication Data
US 2015/0192889 A1    Jul. 9, 2015

(30) Foreign Application Priority Data

Oct. 4, 2012 (JP) .................................. 2012-222540
Oct. 4, 2012 (JP) .................................. 2012-222541

(51) Int. Cl.
*G03G 15/00* (2006.01)
*G06F 3/12* (2006.01)
*H04N 1/00* (2006.01)
(Continued)

(52) U.S. Cl.
CPC ............ *G03G 15/80* (2013.01); *G03G 15/5075* (2013.01); *G06F 1/266* (2013.01); *G06F 1/305* (2013.01); *G06F 3/1221* (2013.01); *G06F 3/1229* (2013.01); *G06F 3/1285* (2013.01); *H04N 1/00891* (2013.01); *H04N 1/00973* (2013.01); *Y02B 60/1271* (2013.01)

(58) Field of Classification Search
CPC ......................... G03G 15/5075; G03G 15/80
See application file for complete search history.

(56) References Cited

U.S. PATENT DOCUMENTS 6,072,585 A  *  6/2000  Dutton et al. ................ 358/1.12
8,296,594 B2    10/2012  Okuzono et al.
2007/0280708 A1* 12/2007  Kamisuwa et al. ............. 399/37
(Continued)

FOREIGN PATENT DOCUMENTS

JP           8-95726 A      4/1996
JP       2005-252890 A      9/2005
(Continued)

OTHER PUBLICATIONS

Machine Translation of JP 2006-139145 A obtained on Jul. 23, 2015.*

*Primary Examiner* — Gregory H Curran
(74) *Attorney, Agent, or Firm* — Fitzpatrick, Cella, Harper & Scinto

(57) ABSTRACT

An image forming apparatus capable of connecting to a network receives via the network an electric power control signal for instructing electric power control, turns off a power of the image forming apparatus in accordance with the electric power control signal, and presents, to a user, information indicating that the image forming apparatus entered a power off state due to the electric power control signal. Also, a method of controlling such an image forming apparatus, and a program.

16 Claims, 14 Drawing Sheets

(51) Int. Cl.
*G06F 1/26* (2006.01)
*G06F 1/30* (2006.01)

(56) References Cited

U.S. PATENT DOCUMENTS

2008/0188993 A1   8/2008  Ikusawa
2010/0325462 A1*  12/2010 Okuzono et al. .............. 713/324

FOREIGN PATENT DOCUMENTS

| JP | 2006-139145 A | 6/2006 |
| JP | 2007-320051 A | 12/2007 |
| JP | 2008-192037 A | 8/2008 |
| JP | 2010-161848 A | 7/2010 |
| JP | 2010-206979 A | 9/2010 |
| JP | 2011-3067 A   | 1/2011 |

* cited by examiner

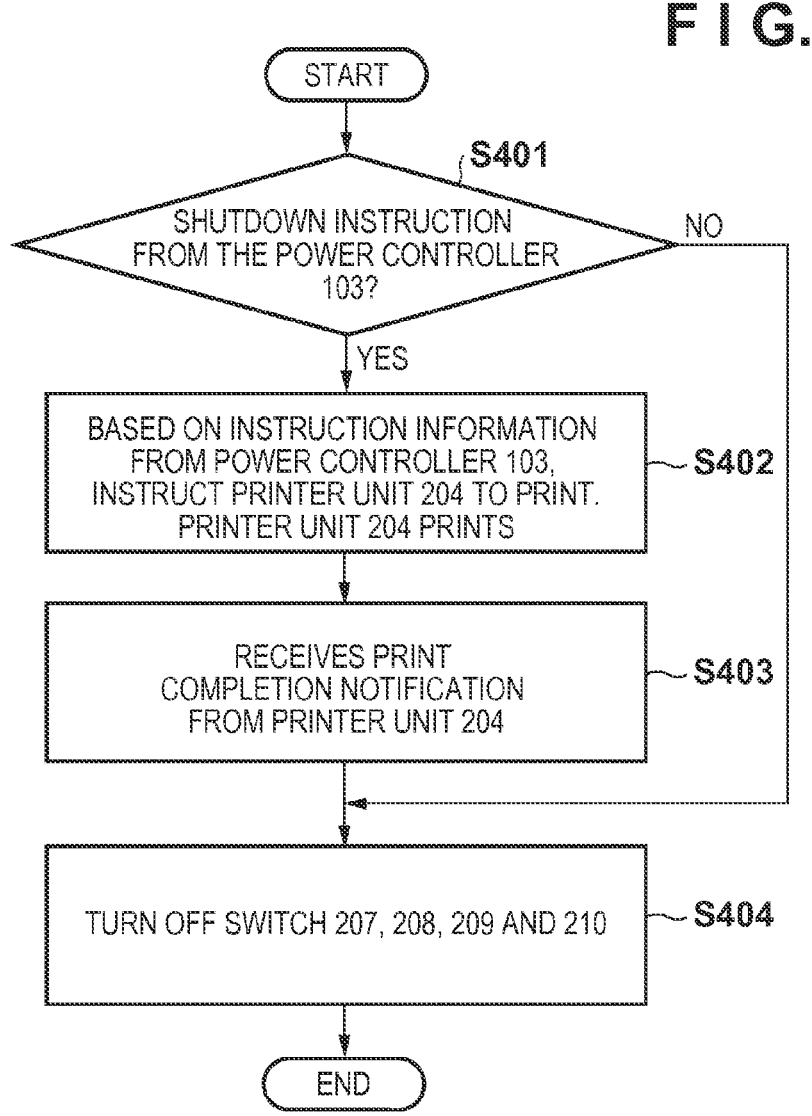

| TRANSMISSION ORIGIN | TRANSMISSION DESTINATION | MODEL CLASSIFICATION | CONTROL INFORMATION | ADDITIONAL INFORMATION |
|---|---|---|---|---|
| 1 | 2 | MFP | SHUTDOWN | OTHER DEVICE INFORMATION: MFP_XXX= USABLE MFP_YYY= UNUSABLE |

IMAGE FORMING APPARATUS, CONTROL METHOD AND PROGRAM

TECHNICAL FIELD

The present invention relates to an image forming apparatus for performing electric power control in accordance with a change in an electric power supply amount, and to a control method and program thereof.

BACKGROUND ART

Conventionally, in a multi function peripheral (MFP) in which an electrophographic method is employed in a printer unit, a large amount of electric power is necessary for image forming. In particular, for a fixing unit, an image forming unit, a circuit for processing image data and the like, electric power consumption is large. Meanwhile, due to increase in energy conservation consciousness, strengthening of regulations and the like in recent years, the necessity to perform electric power control meticulously is increasing. For example, in Japanese Patent Laid-Open No. 2010-161848, it is recited that when a rated value of a breaker is approached, a user is notified, and an electric power of a device is turned off. Furthermore, a technique is considered in which, in a case where a power demand amount increases and a power supply capability is pressed, by automatically causing an electric power supply amount to change as well as turning off an electric power of a device that is consuming electric power, an electric power consumption amount is reduced and an electric power peak is restrained.

However, in the case of such a situation, a problem is in the point that a user using the device cannot distinguish whether the power of the device was turned off because the electric power supply amount was pressed or whether the power was simply turned off. Furthermore, regardless of the fact that the power of the device was turned off because the electric power supply amount was pressed, there is a possibility of an electric power consumption amount increasing due to the user turning on the power of the device, and a situation occurring in which an electric power supply amount is exceeded.

SUMMARY OF INVENTION

An aspect of the present invention is to eliminate the above-mentioned problems with the conventional technology.

A feature of the present invention is to provide a technique in which it is made possible, in a case of a state in which an image forming apparatus in response to a fluctuation in an electric power supply amount turned off an electric power, for a user to grasp whether or not the reason for the power off is that it was in response to a fluctuation in an electric power supply amount.

According to an aspect of the present invention, there is provided an image forming apparatus capable of connecting to a network, comprising: reception means for receiving via the network an electric power control signal for instructing electric power control, shutdown means for turning off a power of the image forming apparatus in accordance with the electric power control signal received by the reception means and presentation means for presenting to a user information indicating that the power of the image forming apparatus became off due to the electric power control signal.

According to another aspect of the present invention, there is provided an image forming apparatus capable of connecting to a network, comprising: reception means for receiving via the network an electric power control signal for instructing electric power control, shutdown means for turning off a power of the image forming apparatus in accordance with the electric power control signal received by the reception means, storage means for storing information for indicating that the power of the image forming apparatus is turned off due to the electric power control signal, determination means for determining, in a case where, after the power of the image forming apparatus was turned off, the image forming apparatus is started up, whether or not the information is stored in the storage means and control means for controlling, in a case where it is determined, by the determination means, that the information is not stored, so as to start up the image forming apparatus in a first power state, and for controlling, in a case where it is determined, by the determination means, that the information is stored, so as to start up the image forming apparatus in a second power state having greater conservation of power than the first power state.

Further features and aspects of the present invention will become apparent from the following description of exemplary embodiments, with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 4 is a flowchart for describing shutdown processing by the controller of the MFP according to the first embodiment.

FIG. 5 is a view for illustrating an example of a request framework for a shutdown instruction (electric power control signal) transmitted to the MFP via a network from a power controller according to the first embodiment.

DESCRIPTION OF EMBODIMENTS

Embodiments of the present invention will be described hereinafter in detail, with reference to the accompanying drawings. It is to be understood that the following embodiments are not intended to limit the scope of the claims of the present invention, and that not all of the combinations of the aspects that are described according to the following embodiments are necessarily required with respect to the means to solve the problems according to the present invention. Note, in the present embodiment, exemplary explanation is given of a multi function peripheral as one example of an image forming apparatus, but the present invention is not something that is limited to an MFP.

First Embodiment

In a first embodiment, explanation will be given with an example in which a multi function device (multi function peripheral), which turned off a power because a power demand amount increased with respect to an electric power supply amount for which supply is possible, notifies, using a print material, a user of the fact that a reason for the power off is that it was in response to a fluctuation in an electric power supply amount.

Figure 1:
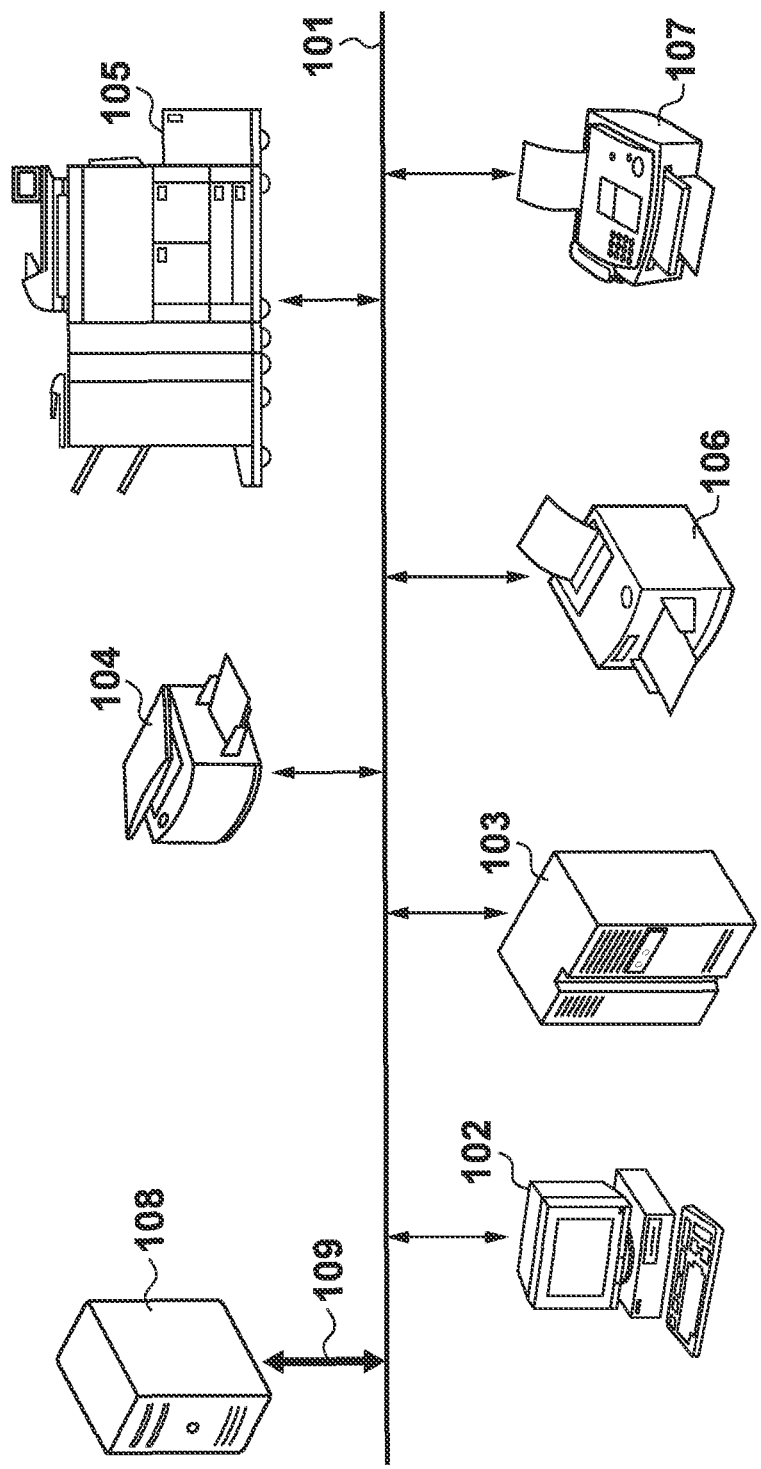
FIG. 1 is a view for showing an overall configuration of an information processing system according to a first embodiment.

FIG. 1 is a view for showing an overall configuration of an information processing system according to a first embodiment.

In this system, devices such as an MFP 104, an MFP 105, a printer 106, a FAX 107 are connected to a network 101. Here this network is Ethernet (registered trademark). The first embodiment does not depend on the type of the network and may be adopted to another type of network. A PC 102 is a PC (personal computer) that the user uses, and it can perform data transmission and receiving with devices such as the MFP 104, the MFP 105, the printer 106, the FAX 107 via the network 101. A power management server 108 is an electric power management server existing on a power company side, and it maintains a consumable electric power amount which a user is able to use. The power management server 108 is connected to the network 101 to which the MFP 104 is connected via an external network 109. A power controller 103 is a server for managing an electric power consumption amount within the system, and it performs a shutdown instruction to devices included in the system in a case where a power amount is pressed based on the consumable electric power amount acquired from the power management server 108.

The MFP 104 and the MFP 105 are multi function devices in which a functions such as copy, printer and scanner are integrated. Here the MFP 104 and the MFP 105 can perform settings such as a setting for whether or not to perform a color print, and print speed, and in accordance with these settings, the electric power consumption changes significantly. In particular, for a printer of an electrophographic method type which performs thermal fixation of toner, a large amount of electric power is necessary for a heater of a fixing unit. In general, the electric power consumption for the color print is greater than for a black and white print, and the faster the print speed, the greater the electric power consumption becomes. The printer 106 and the FAX 107 are respectively a printing device and a facsimile device having a single function.

Next, explanation will be given for a structure and an operation of the MFP 104 according to the first embodiment. The first embodiment will be explained here giving the MFP 104 as an example, though adoption to the MFP 105, the printer 106 or the FAX 107 is also possible.

Figure 2:
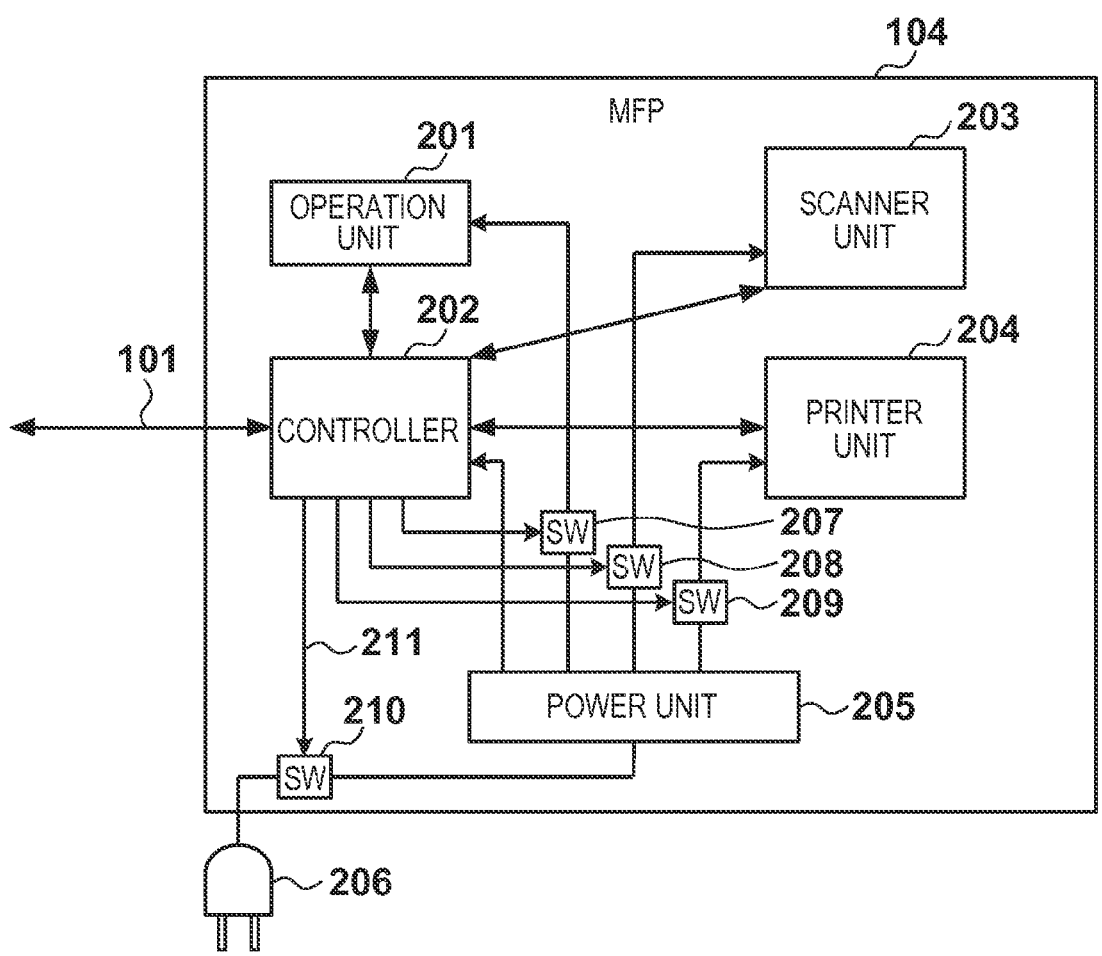
FIG. 2 is a block diagram for showing a configuration of an MFP according to the first embodiment.

FIG. 2 is a block diagram for showing a configuration of an MFP 104 according to the first embodiment.

A controller 202 controls operation of the MFP 104 on the whole and performs data transmission and receiving, data conversion, data saving and electric power control.

In a case where the MFP 104 performs a print operation, the PC 102 generates a print job, and transmits the print job to the MFP 104 via the network 101. With this, the controller 202 receives the print job and temporarily saves it into a memory (not shown) in the controller 202 and the controller 202 converts data of the print job that it saved into image data and outputs this to a printer unit 204. The printer unit 204 prints an image onto a sheet (paper) based on the image data under the control of the controller 202, and discharges the printed sheet.

Explanation will be given for a case in which the MFP 104 performs a scan operation. In this case, after the user sets an original into a scanner unit 203, setting of the scan operation is performed by operating a button while referencing a screen of an operation unit 201. Then, the scan operation is initiated when a start button of the operation unit 201 is pressed, and under the control of the controller 202, the scanner unit 203 optically scans the original and converts it into image data. The controller 202, after temporarily saving the image data acquired in this way, converts a data format in accordance with setting details specified with the operation unit 201 beforehand, and transfers to a transmission destination.

Also, in a case where the MFP 104 performs a copy operation, after the user sets the original into the scanner unit 203, the copy operation is set by operating a button while referencing the screen of the operation unit 201. The copy operation is initiated when the start button of the operation unit 201 is pressed. The scanner unit 203 optically scans the original under the control of the controller 202 and converts the image data. After the image data is saved into the memory in the controller 202, the controller 202 converts its data format and outputs it to the printer unit 204. The printer unit 204 prints an image on a sheet based on the image data and discharges the printed sheet to the exterior of the MFP 104.

A power unit 205, converts a commercial power supply from a power plug 206 into voltage to be used by the units of the MFP 104. A power switch 210 is a switch for turning on/off a power of the MFP 104, and the power switch 210 is put into an on state by an operation of the user in order to turn on the power. The control line 211 is connected between the controller 202 and the power switch 210 and the controller 202 can turn off the power of the MFP 104 by the control line 211.

After the shutdown processing completes, a CPU 302 (FIG. 3) of the controller 202 can turn off the power switch 210 by causing a signal of the control line 211 to change, and then a state in which there is a complete power off of the MFP 104 is entered. The power switch 210 is a switch of a solenoid type, a power supply of which can be turned off by a flow of electric current from the control line 211. The switch 207, the switch 208 and the switch 209 turn on/off power supply to units, based on signals from the controller 202. Here, the switch 207 turns on/off a power supply from the power unit 205 to the operation unit 201. The switch 208 turns on/off a power supply from the power unit 205 to the scanner unit 203. Furthermore, the switch 209 turns on/off a power supply from the power unit 205 to the printer unit 204.

Figure 3:
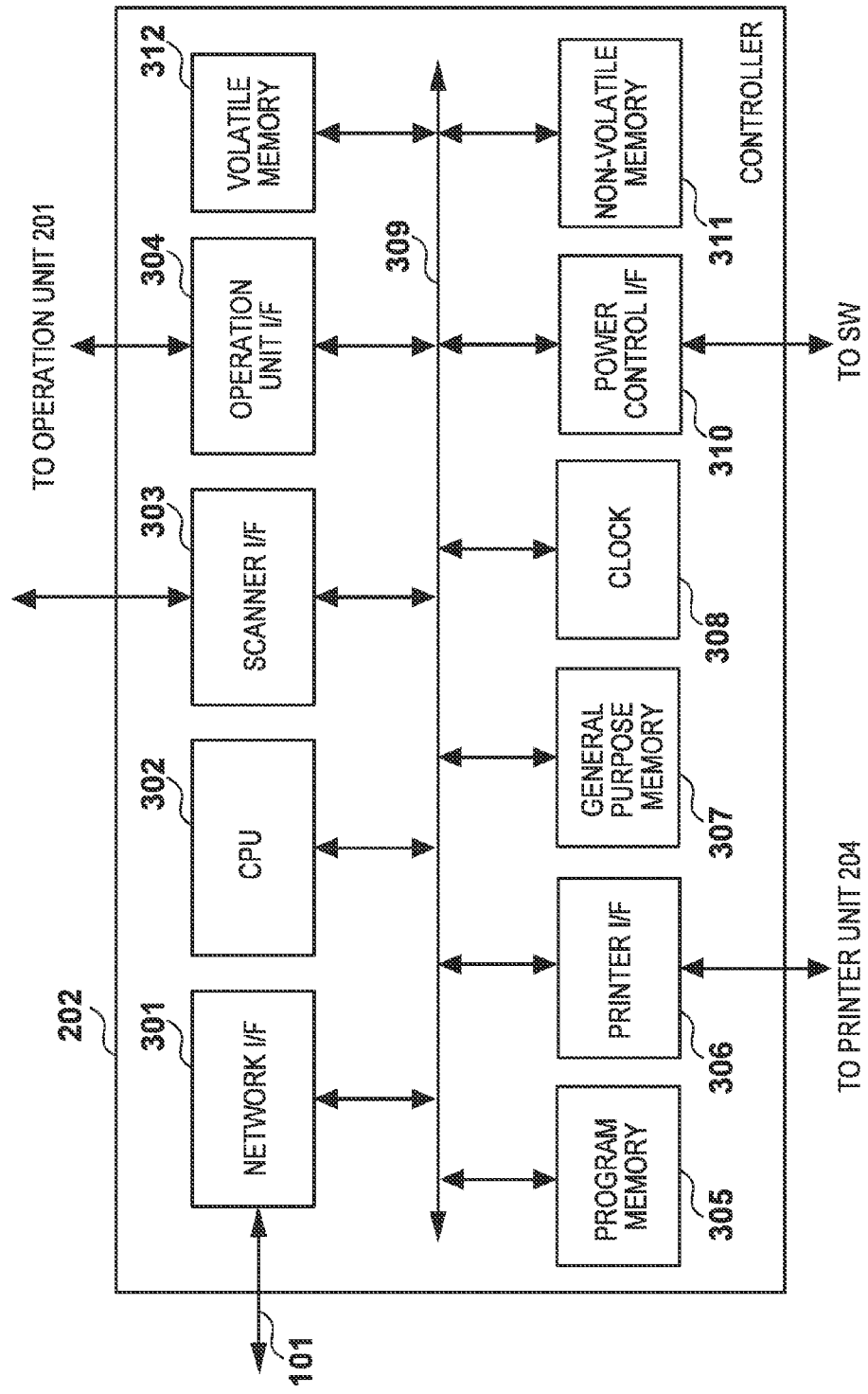
FIG. 3 is a block diagram for showing a configuration of a controller of the MFP according to the first embodiment.

FIG. 3 is a block diagram for showing a configuration of the controller 202 of the MFP 104 according to the first embodiment.

The CPU 302 which controls the controller 202 executes a program stored in a program memory 305 which is a non-volatile memory, and performs various processing with a general purpose memory 307 as a temporary storage area. Also, the CPU 302 is connected to a network I/F 301, a scanner I/F 303 which performs communication with the scanner unit 203, an operation unit I/F 304 which performs communication with the operation unit 201, and a printer I/F 306 which performs communication with the printer unit 204 via an internal bus 309. Furthermore, the CPU 302 is connected with a clock 308, a power control I/F 310 a non-volatile memory 311, and a volatile memory 312, such as a RAM, via the internal bus 309. For the clock 308, in order to maintain the precision of its timing, its time is periodically corrected by an NTP (Network Time Protocol) method via the network 101.

The non-volatile memory 311 may maintain information such as information indicating whether or not a shutdown was performed due to a shutdown instruction from the power controller 103, which is described later.

The power control I/F 310, by the control of the CPU 302, is an output port for outputting control signals to the switch 207, the switch 208 and the switch 209 to turn these switches on/off.

When the MFP 104 is in a sleep mode, by the control of the CPU 302, the switch 207, the switch 208 and the switch 209 are in an off state, and power supply to the operation unit 201, the scanner unit 203 and the printer unit 204 is blocked.

Transition from the sleep mode to a normal state is caused to occur by the receipt of the print job via the network 101, by the pressing of a power button of the operation unit 201 or by an alarm of the clock 308 going off. Detection of these is done by the CPU 302 and in accordance with this detection, performance of supplying electric power to the necessary parts is performed by operating the switch 207, the switch 208 or the switch 209. When execution of the print job completes and the print operation finishes, once again transition is made into the sleep mode. The above description is an outline of the structure and the operation of the MFP 104.

FIG. 4 is a flowchart for describing shutdown processing by the controller 202 of the MFP 104 according to the first embodiment. This processing can be realized by storing a program for executing this flowchart in the program memory 305 and by the CPU 302 executing this program.

This processing is started by the shutdown instruction being performed by the user operating the operation unit 201 or by receiving the shutdown instruction from the power controller 103 via the network 101. Firstly, in step S401, the CPU 302 determines whether or not there is a shutdown instruction from the power controller 103. In a case where it is determined that there is a shutdown instruction from the power controller 103, the processing proceeds to step S402, and when there is not, the processing proceeds to step S404. In step S402, the CPU 302, based on instruction information (request framework: explained later) from the power controller 103, transmits a print instruction to the printer unit 204, and the printer unit 204 prints based on that information. Next, the processing proceeds to step S403, and the CPU 302 receives a print completion notification from the printer unit 204. Next, the processing proceeds to step S404 and the CPU 302 completes the shutdown processing by turning off the switch 207, the switch 208, the switch 209 and the switch 210 with control signals to the switch 207, the switch 208, the switch 209 and the switch 210 via the power control I/F 310. With this, the power of the MFP 104 turns off. Note, the power off state that the MFP 104 transitions into after the shutdown processing is a state in which volatile memory such as RAM is powered. This state includes a suspend state in which high speed recovery is possible using status information of an OS, etcetera, stored in a RAM on shutdown. Furthermore, a hibernation state from which high speed recovery is possible using status information of the OS, etcetera, stored in a non-volatile memory such as an HDD, or the like, on shutdown is also included.

Meanwhile, in step S401, in a case where it is determined that there is no shutdown instruction from the power controller 103, the processing proceeds to step S404. In step S404, the CPU 302 turns off the power supply to the controller 202, the operation unit 201, the scanner unit 203 and the printer unit 204 by turning off all of the switch 207, the switch 208, the switch 209 and the switch 210, which are of the solenoid type.

By this processing, when shutdown is executed with the shutdown instruction from the power controller 103, a message indicating that the power off is due to the shutdown instruction from the power controller 103 is printed by the printer unit 204. With this, the user can distinguish whether the shutdown is due to an operation of the user or something that is due to the shutdown instruction from the power controller 103.

FIG. 5 is a view for illustrating an example of the request framework for the shutdown instruction (electric power control signal) transmitted to the MFP 104 via the network 101 from the power controller 103 according to the first embodiment.

In FIG. 5, numeral 501 denotes a transmission origin, and here the "1" indicates the power controller 103. Numeral 502 denotes a transmission destination of the request framework and here the "2" indicates the MFP 104. Numeral 503 denotes a classification of a model of the transmission destination of the request framework and here "MFP" is set. Numeral 504 denotes control information that the model that received the request framework controls. In the case of the example of FIG. 5 "shutdown", which indicates shutdown, is recorded. Numeral 505 denotes additional information that is attached to the request framework, and recites supplementary information of the control details. In this case, it is indicated that the scheduled time for cancelling of the shutdown instruction is 16:00. The request framework shown in FIG. 5 is only one example, and limitation to this is not made.

Figures 6, 7:
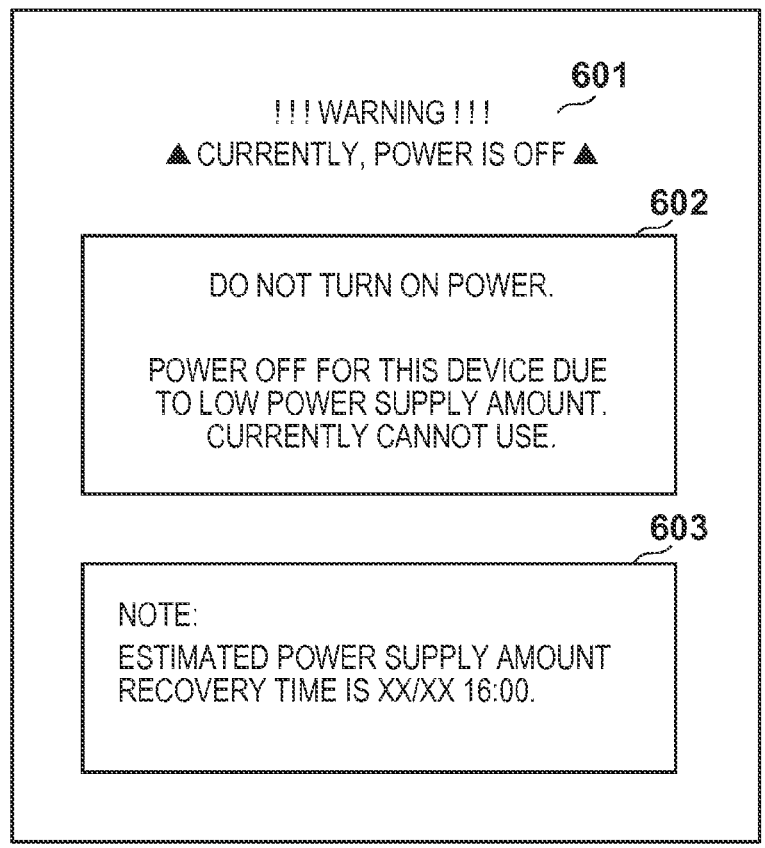
FIG. 6 is a view for illustrating an example of a print material that the printer unit printed in step S402 of FIG. 4.
FIG. 7 is a view for illustrating an example of a request framework for the shutdown instruction (electric power control signal) transmitted to the MFP via a network from the power controller according to a second embodiment.

FIG. 6 is a view for illustrating an example of a print material that the printer unit 204 printed in step S402 of FIG. 4.

In FIG. 6, explanation is given dividing print information into 3 parts. Numeral 601 denotes a status display part for conveying the fact that currently the power is off. Numeral 602 denotes a details display part for displaying a reason for the power being off, points to note and the like. Numeral 603 denotes a display example as further supplementary information, and here a scheduled time for restoration of the electric power supply amount is displayed based on the supplementary information 505 of FIG. 5.

With the first embodiment as described above, when the power of the MFP is turned off, it is possible to discriminate whether or not it is a power off due to the electric power supply amount being pressed, or whether it is a power off due to an operation of the user from a print material printed by the MFP. With this, the user, in accordance with this instruction on the print material, methods of coping such as, for example, avoiding turning on the power of the MFP or waiting until the scheduled time for the electric power supply amount to be restored and then turning on the power, or the like, become possible.

Second Embodiment

In a second embodiment explanation will be given for a point of the printer unit 204 adding usage possibility information indicating whether or not another MFP existing in the same area can be used to the information that it prints. Note, because the system configuration and the configuration of the MFP in the second embodiment are the same as in the previously described first embodiment, explanation of these will be omitted.

FIG. 7 is a view for illustrating an example of the request framework for the shutdown instruction (electric power control signal) transmitted to the MFP 104 via the network 101 from the power controller 103 according to the second embodiment.

Comparing to the request framework shown in FIG. 5, numerals 701, 702, 703 and 704 are the same as numerals 501, 502, 503 and 504 of FIG. 5. Numeral 705 includes information as to which, out of the MFPs within the same area that the power controller 103 manages can be alternatively used and which cannot be used as supplementary information of control details. By printing this as comment information of the print material, the user is able to know which MFP can be used.

Figure 8:
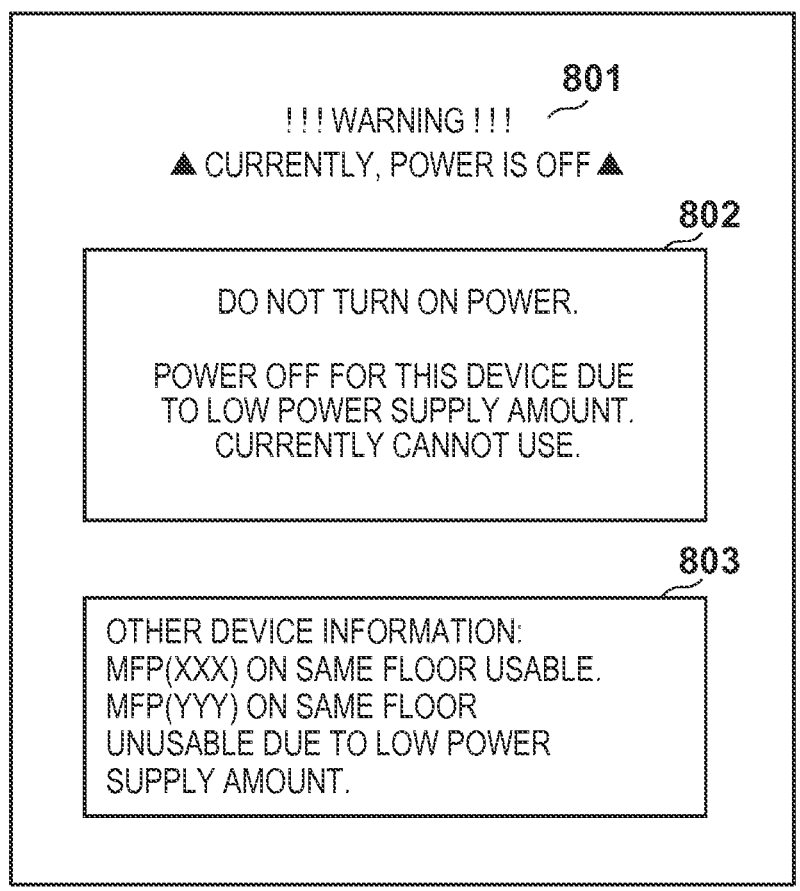
FIG. 8 is a view for illustrating an example of the print material that the printer unit printed in step S402 of FIG. 4 corresponding to the second embodiment.

FIG. 8 is a view for illustrating an example of the print material that the printer unit 204 printed in step S402 of FIG. 4 corresponding to the second embodiment.

Here as in FIG. 6, explanation is given dividing print information into 3 parts. Numerals 801 and 802 are the same as numerals 601 and 602 in FIG. 6. Numeral 803 is a supplementary information display part that displays information of other MFPs within the same area that the power controller 103 manages based on the information of numeral 705 in FIG. 7 received from the power controller 103 as further supplementary information.

Numeral 803 in FIG. 8 corresponds to number 705 of FIG. 7 and it is printed that MFP(XXX) which is on the same floor can be used but that MFP(YYY) which is also on the same floor cannot be used.

In the above described first embodiment and second embodiment, a configuration in which information is presented to the user by a print material was explained, but this is not something that is limited to this kind of print material notification method of the information. For example, a configuration can be considered in which a display apparatus capable of displaying even when the power is turned off, such as electronic paper, is arranged, and the MFP, before executing the shutdown processing, displays details such as in FIG. 6 or FIG. 8 to the display apparatus and then performs shutdown.

Figure 10:
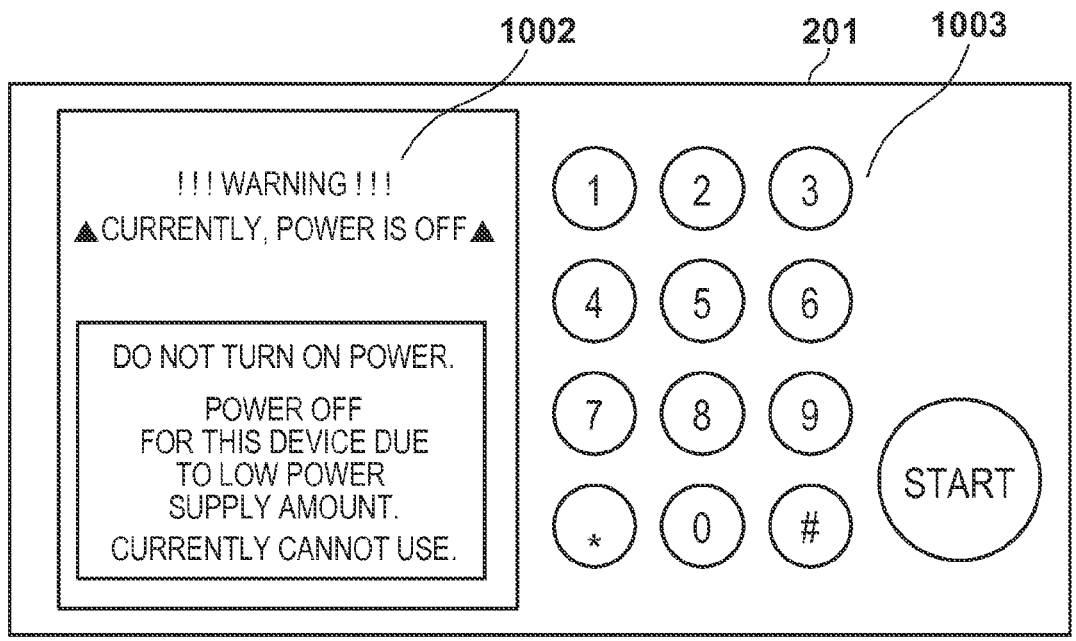
FIG. 10 is a view for illustrating a display example of a case in which a display unit of an operation unit is a display apparatus capable of displaying even when a power is turned off such as electronic paper.

FIG. 10 is a view for illustrating a display example of a case in which a display unit of the operation unit 201 is a display apparatus capable of displaying even when a power is turned off such as electronic paper.

Numeral 1003 denotes a hard key part including a numeric keypad and a start key. A display unit 1002 is an electronic paper display unit. By turning off the power of the MFP 104 having displayed information such as in FIG. 6 or FIG. 8 in this part, even in a state where the power is off it is possible to notify the user of the information.

With the second embodiment as explained above, because in addition to the effect of the above described first embodiment it is possible to grasp what other MFPs can alternatively print, it is useful in cases when a user wishes to print in a hurry.

Also, because information is presented to the user, there is the effect that it is possible to conserve resources by constraining an amount of consumption of paper due to the usage of a display apparatus such as electronic paper which is capable of displaying even when the power is off.

Third Embodiment

In the third embodiment, explanation will be given for processing for specifying a bin which is a discharge destination of the print material to be the bin at the most upper level in order to make it easier to be noticed by the user when the print material explained in FIG. 6 of the first embodiment is discharged. Note, because the system configuration and the configuration of the MFP in the third embodiment are the same as in the previously described first embodiment, explanation of these will be omitted.

Figure 9:
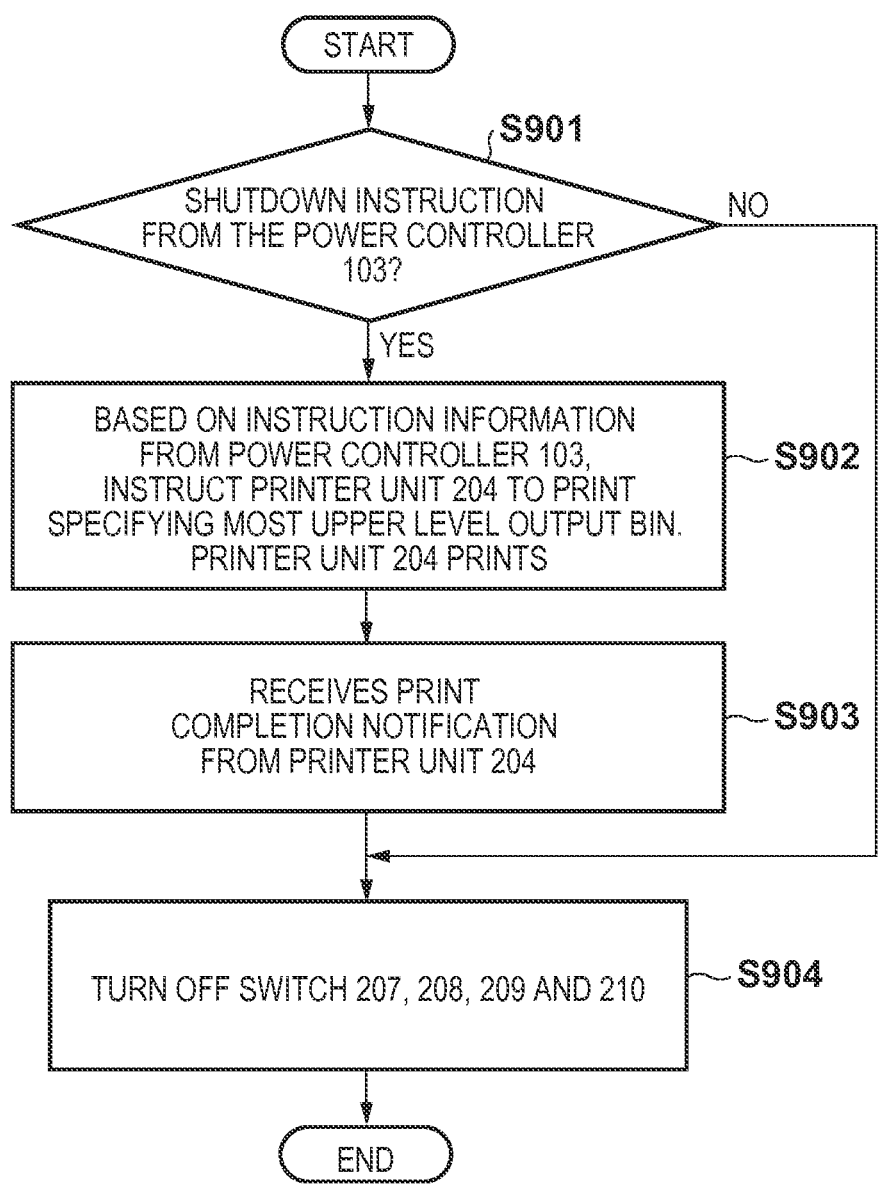
FIG. 9 is a flowchart for describing shutdown processing by the controller of the MFP according to a third embodiment.

FIG. 9 is a flowchart for describing shutdown processing by the controller 202 of the MFP 104 according to the third embodiment. This processing can be realized by storing a program for executing this flowchart in the program memory 305 and by the CPU 302 executing this program. Note, processing in step S901, step S903 through step S904 in FIG. 9 is the same as that of step S401, step S403 and step S404 in FIG. 4.

This processing is started by the shutdown instruction being performed by the user operating the operation unit 201 or by receiving the shutdown instruction from the power controller 103 via the network 101. Firstly, in step S901, the CPU 302 determines whether or not there is a shutdown instruction from the power controller 103. In a case where it is determined that there is the shutdown instruction from the power controller 103, the processing proceeds to step S902, and the CPU 302 transmits a print instruction to the printer unit 204 based on the instruction information from the power controller 103. At this time, specification of a bin into which to discharge the print material to be the bin at the most upper level is made in order to make the print material easier to be noticed by the user. With this, the printer unit 204 prints the information and discharges the print material to the specified bin. Next, the processing proceeds to step S903, and the CPU 302 receives a print completion notification from the printer unit 204. Next, the processing proceeds to step S904, and the CPU 302 completes the shutdown processing by turning off the switch 207, the switch 208, the switch 209 and the switch 210. Also, in step S901, when it is not a shutdown instruction from the power controller 103, the processing proceeds to step S904, and the CPU 302 completes the shutdown processing by turning off the switch 207, the switch 208, the switch 209 and the switch 210.

By the third embodiment, as explained above, there is the effect that it is possible for the user to more reliably grasp the reason that the power of the MFP was turned off by discharging into a place that is easy for the user to notice the print material for presenting the information to the user.

Fourth Embodiment

In the fourth embodiment, explanation will be given for processing for a case where when the shutdown instruction information from the power controller 103 is received the power of the MFP 104 is already turned off. Note, because the system configuration and the configuration of the MFP in the fourth embodiment are the same as in the previously described first embodiment, explanation of these will be omitted.

Figure 11:
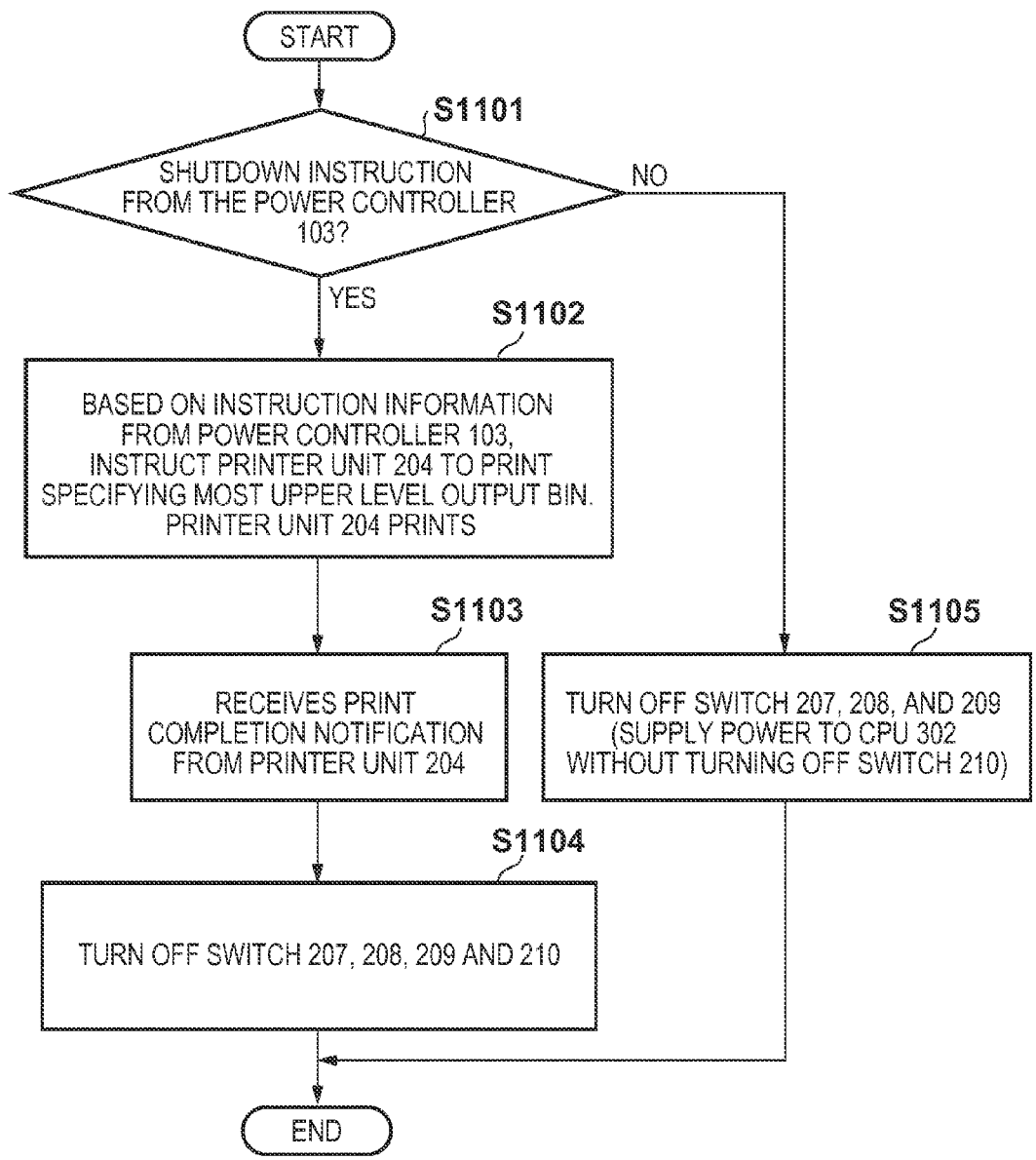
FIG. 11 is a flowchart for describing shutdown processing by the controller of the MFP according to a fourth embodiment.

FIG. 11 is a flowchart for describing shutdown processing by the controller 202 of the MFP 104 in the fourth embodiment. This processing can be realized by storing a program for executing this flowchart in the program memory 305 and by the CPU 302 executing this program.

This processing is started by the shutdown instruction being performed by the user operating the operation unit 201 or by receiving the shutdown instruction from the power controller 103 via the network 101. Firstly, in step S1101, the CPU 302 determines whether or not there is a shutdown instruction from the power controller 103. In a case where it determines that there is the shutdown instruction from the power controller 103, the processing proceeds to step S1102, and in a case where it determines that there is no shutdown instruction from the power controller 103, the processing proceeds to step S1105. In step S1102, the CPU 302 outputs a print instruction to the printer unit 204 based on the instruction information from the power controller 103. With this, the printer unit 204 print the information. Next, the processing proceeds to step S1103, and the CPU 302 receives a print completion notification from the printer unit 204. Next, the processing proceeds to step S1104, and the CPU 302 completes the shutdown processing by turning off the switch 207, the switch 208, the switch 209 and the switch 210.

Meanwhile, in a case where there is no shutdown instruction from the power controller 103, the CPU 302 turns off the switch 207, the switch 208 and the switch 209 in step S1105. Furthermore, the CPU 302 puts the switch 210 in an on state, sets a state in which the power is supplied to the CPU 302 and completes the shutdown processing.

In a case of a shutdown instruction from the power controller 103, the MFP 104 is completely shutdown, but in a case of the shutdown instruction performed by the user operating the operation unit 201, shutdown is performed in a state in which the controller 202 is powered.

Figure 12:
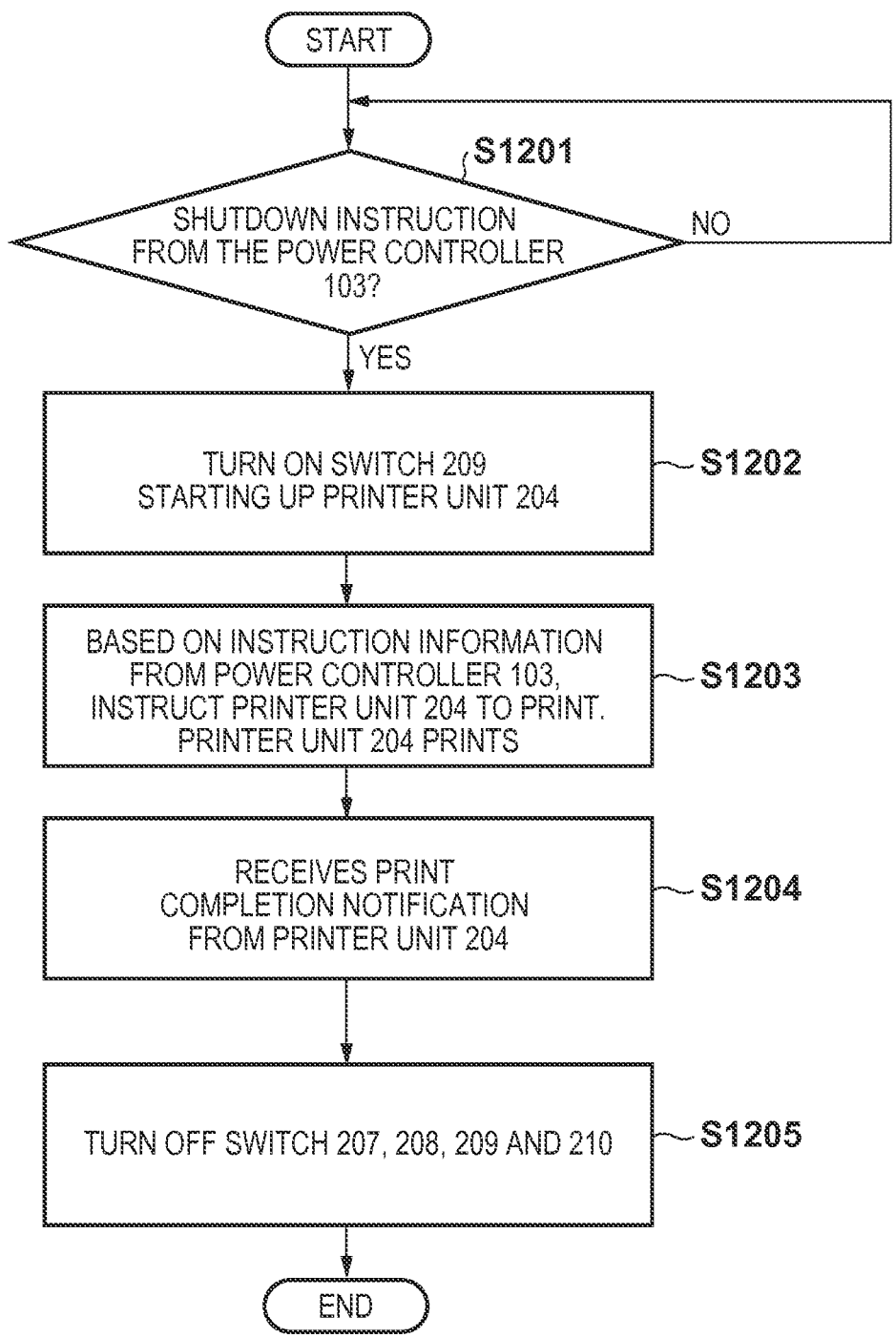
FIG. 12 is a flowchart for describing shutdown processing by the controller of the MFP in the fourth embodiment in a case where the shutdown instruction was received from the power controller after performing the shutdown processing in step S1105 of FIG. 11.

FIG. 12 is a flowchart for describing shutdown processing by the controller 202 of the MFP 104 in the fourth embodiment in a case where the shutdown instruction was received from the power controller 103 after performing the shutdown processing in step S1105 of FIG. 11. This processing can be realized by storing a program for executing this flowchart in the program memory 305 and by the CPU 302 executing this program.

Firstly, in step S1201, the CPU 302 determines whether or not there is a shutdown instruction from the power controller 103 via the network 101. In a case where it is not received, the processing returns to step S1201, and in a case where it is received the processing proceeds to step S1202. In step S1202, the CPU 302 turns on the switch 209 powering the printer unit 204. Next the processing proceeds to step S1203, and the CPU 302 transmits the print instruction to the printer unit 204 based on the instruction information from the power controller 103. With this, the printer unit 204 prints the information. Next, the processing proceeds to step S1204, and the CPU 302 receives the print completion notification from the printer unit 204. Next, the processing proceeds to step S1205, and the CPU 302 completes the shutdown processing by turning off the switch 207, the switch 208, the switch 209 and the switch 210.

By the fourth embodiment as explained above, in a case of a shutdown that is not cause by a shutdown instruction from the power controller 103, shutdown is performed in a state in which the controller 202 is powered. Accordingly, in this state, even in a shutdown instruction is received from the power controller 103, it is possible to temporarily power the printer unit 204 and output the previously explained print material. With this, the user can know whether or not it is OK to turn on the power of an MFP in a case where the MFP is in a state in which the power is off.

Note, for the above described first embodiment through to the fourth embodiment were each explained independently, but the configurations of each of the embodiments may be combined as appropriate. For example, in place of the printing of the fourth embodiment, display to a display apparatus such as the electronic paper of the second embodiment may be used.

Fifth Embodiment

In a fifth embodiment, when the MFP, for which a power was turned off (shutdown) because an electric power demand amount increased with respect to an electric power supply amount for which supply is possible, later has the power turned on, the multi function device determines a reason for the power being turned off the previous time. In a case where the power off was triggered by the electric power supply amount, the MFP is started in an energy conservation mode (second power state) for which an electric power consumption amount is smaller than in a normal operation mode (first power state). Also, a notification is made to the user that an instruction for power off triggered by the electric power supply amount has been made, and the user is informed that it is not possible to start up the MFP in the normal operation mode. Note, because the system configuration and the configuration of the MFP in the fifth embodiment are the same as in the previously described first embodiment, explanation of these will be omitted.

Figure 13:
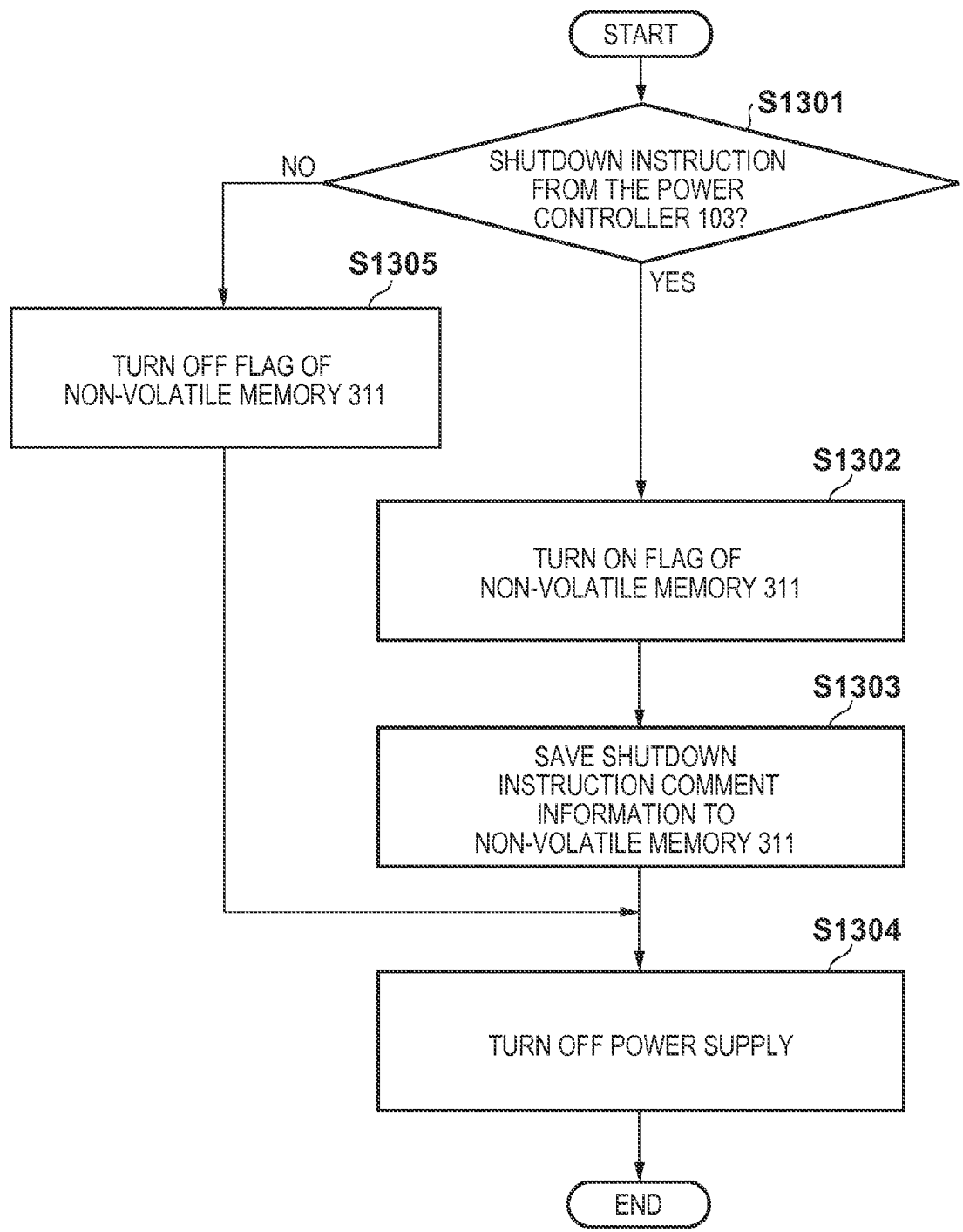
FIG. 13 is a flowchart for describing shutdown processing by the controller of the MFP according to the fifth embodiment.

FIG. 13 is a flowchart for describing shutdown processing by the controller 202 of the MFP 104 according to the fifth embodiment. This processing can be realized by storing a program for executing this flowchart in the program memory 305 and by the CPU 302 executing this program.

This processing is started by the shutdown instruction being performed by the user operating the operation unit 201 or by receiving the shutdown instruction from the power controller 103 via the network 101. Firstly, in step S1301, the CPU 302 determines whether or not there is a shutdown instruction from the power controller 103. In a case where it is determined that there is a shutdown instruction from the power controller 103, the processing proceeds to step S1302, and the CPU 302 turns on a flag of the non-volatile memory 311 for performing the shutdown based on the instruction information from the power controller 103. Next the processing proceeds to step S1303, the CPU 302 saves comment information included in the shutdown instruction information from the power controller 103 into the non-volatile memory 311 and the processing proceeds to step S1304. In step S1304, a control signal for turning off the switch 207, the switch 208, the switch 209 and the switch 210, which are of the solenoid type, is outputted, and the shutdown processing completes. With this, the power of the MFP 104 turns off. Note, the power off state into which the MFP 104 transitions after the shutdown processing is a state in which the volatile memory 312 is powered. This state includes a suspend state in which high speed recovery is possible using status information of an OS, etcetera, stored in the RAM on shutdown. Furthermore, a hibernation state from which high speed recovery is possible using status information of the OS, etcetera, stored in a non-volatile memory such as an HDD, or the like, on shutdown is also included in this state.

Meanwhile, in step S1301, in a case where it is determined that there is no shutdown instruction from the power controller 103, the processing proceeds to step S1305, and a flag of the non-volatile memory 311 is turned off. Next the processing proceeds to step S1304, and the electric power supply to the operation unit 201, the scanner unit 203 and the printer unit 204 is turned off by turning off all of the switch 207, the switch 208, the switch 209 and the switch 210, which are of the solenoid type.

By this processing, when shutdown is executed with a shutdown instruction from the power controller 103, the flag of the non-volatile memory 311 is turned on and the shutdown processing is executed. With this, when next the power of the MFP 104 is turned on, it is possible to determine whether the previous shutdown was due to an operation of the user or to the shutdown instruction from the power controller 103.

Figure 14:
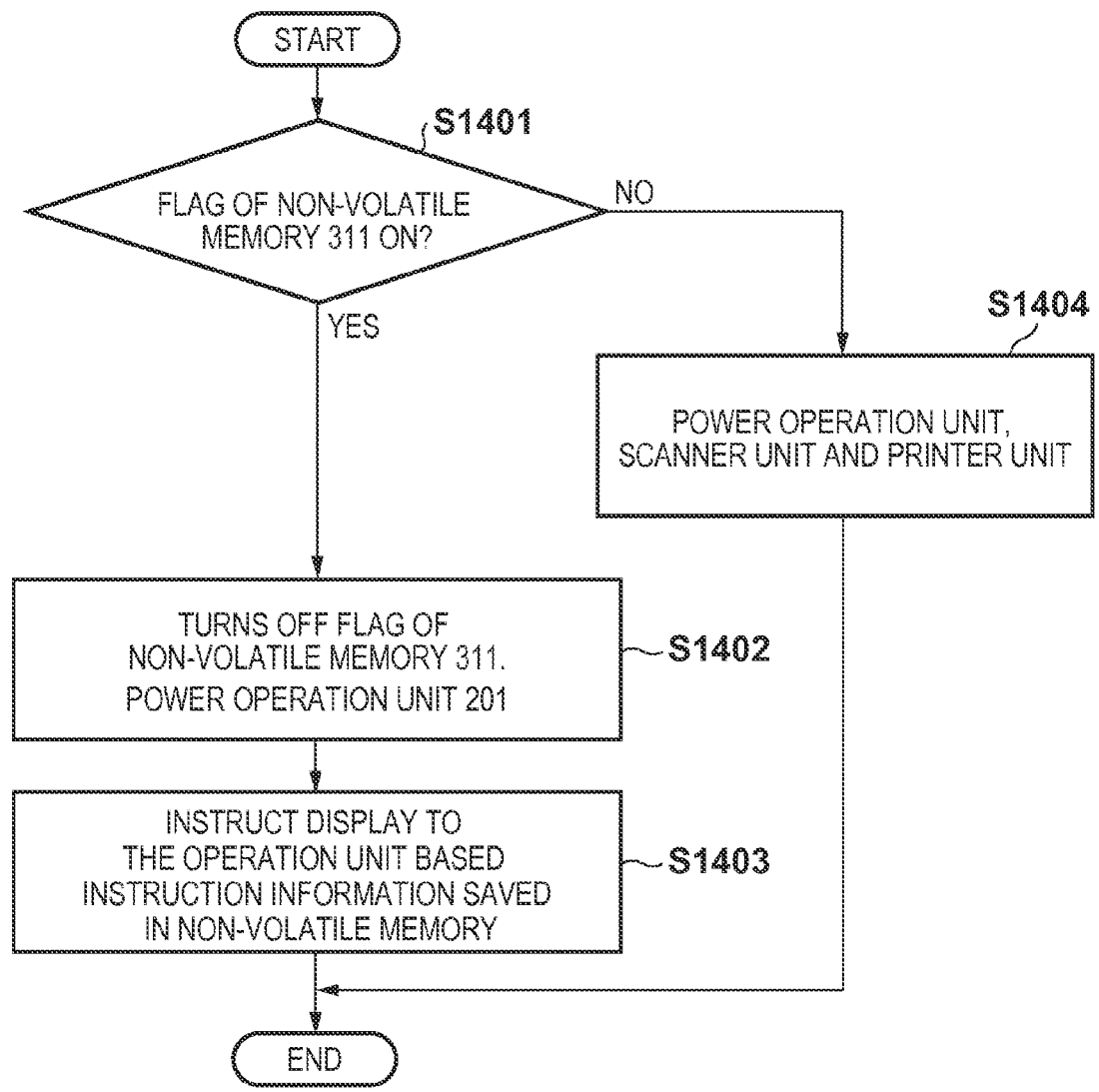
FIG. 14 is flowchart for describing processing in the MFP according to the fifth embodiment for a case in which the MFP starts up in accordance with a user operating a power switch after shutdown.

FIG. 14 is flowchart for describing processing in the MFP 104 according to the fifth embodiment for a case in which the MFP 104 starts up in accordance with a user operating a power switch 210 after shutdown. This processing can be realized by storing a program for executing this flowchart in the program memory 305 and by the CPU 302 executing this program.

This processing is initiated by the power switch 210 being turned on by an operation of the user. In this state, a commercial power supply supplies the power supply unit 205 via the power switch 210, electric power is supplied to the controller 202 from this power supply unit 205 and processing can be executed by the CPU 302. Firstly, in step S1401, the CPU 302 determines whether or not the flag of the non-volatile memory 311 is turned on. In a case where it is determined that the flag of the non-volatile memory 311 is turned on in step S1401, the processing proceeds to step S1402, and when it is determined that the flag is not turned on, the processing proceeds to step S1404. In a case where this flag is turned on, it indicates that there was a shutdown request from the power controller 103, and it can be considered that in this case the electric power supply amount is pressed and that powering should be restrained. The processing proceeds to step S1402, and the CPU 302 first turns off the flag of the non-volatile memory 311. Then the CPU 302, in order to supply the operation unit 201 with power, powers the operation unit 201 by turning on the switch 207 and starting up. Next, the processing proceeds to step S1403, and the CPU 302 completes the start-up processing by instructing display to the operation unit 201 based on the instruction information saved in the non-volatile memory 311.

Meanwhile, if, in step S1401, the flag of the non-volatile memory 311 is turned off, the processing proceeds to step S1404, and the CPU 302 completes the start-up processing by performing the normal start-up processing of turning on the operation unit 201, the scanner unit 203 and the printer unit 204 by turning on the switch 207, the switch 208 and the switch 209.

Note, in step S1402, the reason that the operation unit 201 is powered and display is performed is that if, despite the fact that the user turned on the power switch 210 the MFP 104 does not start up, the user may mistakenly believe that the MFP 104 has broken down. So, in order to convey to the user that he or she cannot use the MFP 104 right now, configuration is taken so as to power the operation unit 201, and to display a message to the user. In this way it is possible to at least restrict the electric power consumption of the MFP 104 at start-up time by powering only the operation unit 201.

Figure 15:
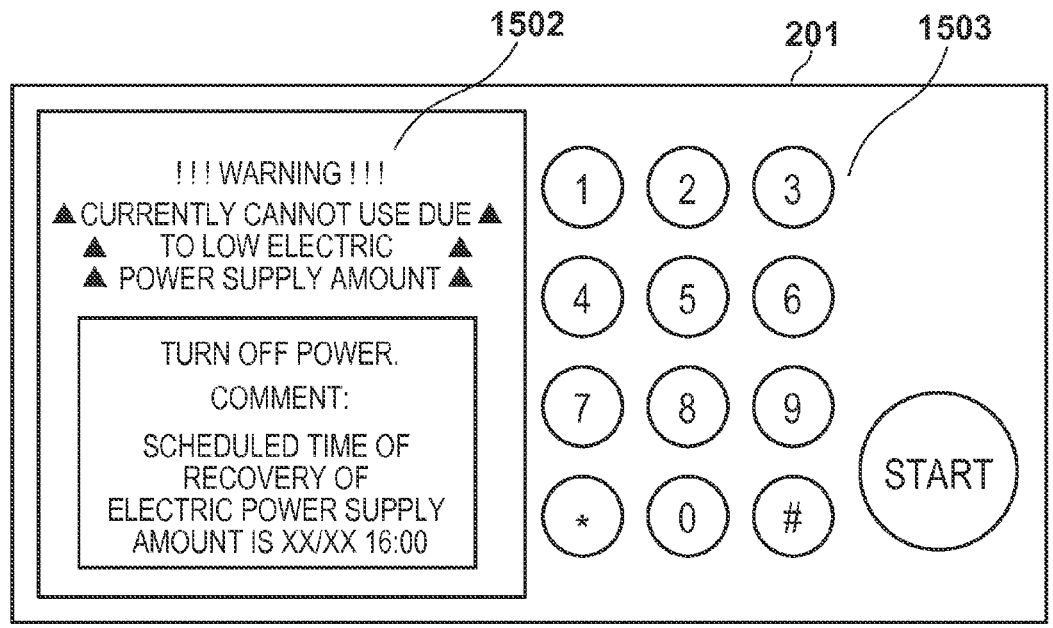
FIG. 15 is a view for showing an example of display to an operation unit of the MFP according to the fifth embodiment.

FIG. 15 is a view for showing an example of display to the operation unit 201 of the MFP 104 according to the fifth embodiment. This display is displayed to the operation unit 201 in step S1403 of previously described FIG. 14, for example.

In the figure, Numeral 1503 denotes a hard key part, and a numeric keypad, a start key or the like is arranged here. In a display unit 1502, currently, information for notifying the user that the power has been turned off by a shutdown instruction from the power controller 103 is displayed. In FIG. 15, in addition to a message reading, "currently cannot use due to low electric power supply amount", a scheduled time of recovery is displayed, such as in "scheduled time of recovery of electric power supply amount is XX/XX 16:00". This is set based on the request framework of FIG. 5, for example, included in the shutdown instruction information from the previously described power controller 103. Note, the display example of FIG. 15 is just one example, and the present invention is not limited to it.

As explained above, by the fifth embodiment, it is possible to not transition into a standby state in which a device can be quickly operated, when the power switch of the device that was shut down because the electric power supply amount was pressed is turned on. With this, it is possible to restrain an increase in the electric power consumption of the system as a whole. Also, because it is possible to display to the effect that the device cannot currently be used due to low electric power supply amount to the user, it is possible to avoid the user mistakenly believing that the device broke down.

Sixth Embodiment

In this sixth embodiment, as a point of difference with the fifth embodiment, explanation will be given for an embodiment in which processing was added for confirming whether the shutdown instruction from the power controller 103 has been cancelled when the user starts up by turning on the power switch of the MFP 104. Note, because the system configuration and the configuration of the MFP in the sixth embodiment are the same as in the previously described fifth embodiment, explanation of these will be omitted.

Figure 16:
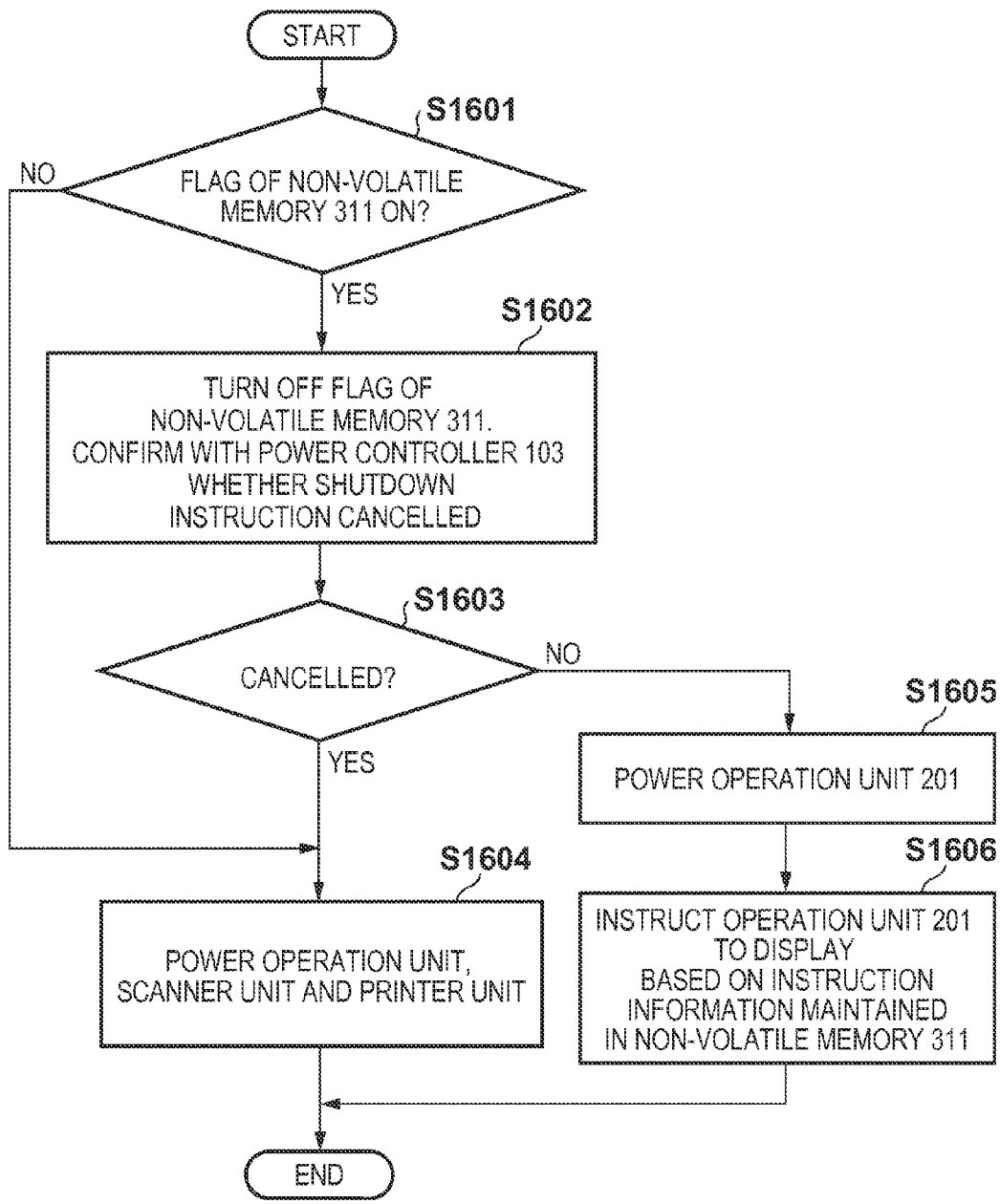
FIG. 16 is a flowchart for describing start-up processing in the MFP according to a sixth embodiment when the user turns on the power switch.

FIG. 16 is a flowchart for describing start-up processing in the MFP 104 according to a sixth embodiment when the user turns on the power switch 210. This processing can be realized by storing a program for executing this flowchart in the program memory 305 and by the CPU 302 executing this program.

This processing is initiated by power being supplied to the controller 202 by the power switch 210 being turned on by an operation of the user. Firstly, in step S1601, the CPU 302 determines whether or not the flag of the non-volatile memory 311 is turned on. In a case where it is determined that the flag of the non-volatile memory 311 is turned on in step S1601, the processing proceeds to step S1602, and when it is determined that the flag is not turned on, the processing proceeds to step S1604. In step S1602, the CPU 302 turns off the flag of the non-volatile memory 311. Then, the CPU 302 confirms by query, via the network I/F 301, with the power controller 103 which is the dispatch origin of the shutdown instruction, whether or not the shutdown instruction has been cancelled. In step S1603, when it is determined, by an answer to the query, that the shutdown instruction has been cancelled, the processing proceeds to step S1604, and the CPU 302 performs normal start-up processing of powering the operation unit 201, the scanner unit 203 and the printer unit 204 is performed by turning on the switch 207, the switch 208 and the switch 209.

Meanwhile, in step S1603, when it is determined, by an answer to the query, that the shutdown instruction has not been cancelled, the processing proceeds to step S1605, and the CPU 302 starts up by powering the operation unit 201 by turning on the switch 207 in order to supply power to the operation unit 201. Next the processing proceeds to step S1606, and the CPU 302, completes the start-up processing by instructing the operation unit 201 to display a message such as that shown in FIG. 15, for example, based on the instruction information maintained in the non-volatile memory 311.

In this way, it is possible to perform a normal start-up in a case where the user turned on the power switch of the MFP 104, even in a case where the power was turned off the previous time due to the electric power supply amount being pressed, if the shutdown instruction from the power controller 103 has been cancelled.

Also, when the shutdown instruction from the power controller 103 has not been cancelled, because it is still a state in which the electric power supply amount is pressed, it is possible to start up in an energy conservation mode and to display to the user something to the effect that the power cannot be turned on immediately.

With this, the MFP 104 can start up normally if the shutdown instruction has not been cancelled when the user turned on the power switch 210 of the MFP 104, even in a case where the MFP 104 was shut down due to a shutdown instruction from the power controller 103. Also, it is possible to start up in the energy conservation mode because it is still a state in which the electric power supply amount is pressed when the shutdown instruction has not been cancelled.

Note, in the above embodiments, a message indicating the scheduled time of recovery is displayed as information for notifying the user. The present invention is not limited to this, and can be configured to display, for example, information stating which other devices in the system can be used, information indicating locations of these usable devices, or the like.

Furthermore, configuration may be made to display a candidate that a MFP that has been prohibited from use but will be made to be usable temporarily by lowering an electric power consumption of other devices in the office, for example. For example, display of "image data can be transmitted from the MFP if the temperature of the air conditioner is lowered by one degree", "by turning off a light it will be possible to print" or the like may be performed.

Also, in the above described embodiments, explanation was given for examples in which start up in made in a second power state in which at least power is supplied to the display unit in a case where the MFP is started up after the power of the MFP is turned off due to an electric power control signal. However, the present invention is not limited to this, and start up may be made in a sleep mode in which electric power supply to the operation unit 201, the scanner unit 203 and the printer unit 204 is stopped and electric power is supplied to the controller 202.

Also, in the above described embodiments, explanation was made for an example in which start up is made in a second power state in which power is supplied to at least the display unit in a case where the MFP is started up after the power of the MFP has been turned off due to an electric power control signal. However, the present invention is not limited to this, and start up may be made in a mode in which power is supplied to at least the network I/F 301 of the controller 202.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-222540, filed Oct. 4, 2012, and No. 2012-222541, filed Oct. 4, 2012, which are hereby incorporated by reference herein in their entirety.

The invention claimed is:

1. An image forming apparatus capable of connecting to a network, comprising:
   a reception unit configured to receive via the network an electric power control signal for instructing electric power control;
   a shutdown unit configured to turn off a power of the image forming apparatus in accordance with the electric power control signal received by the reception unit; and
   a presentation unit configured to present to a user information indicating that the power of the image forming apparatus became off due to the electric power control signal,
   wherein the presentation unit presents the information to the user by a print material.

2. The image forming apparatus according to claim 1, wherein the presentation unit presents the information in accordance with the electric power control signal received by the reception unit and also presents additional information associated with the electric power control signal.

3. The image forming apparatus according to claim 1, further comprising a specification unit configured to specify a discharge destination to which to discharge the print material.

4. The image forming apparatus according to claim 2, wherein the additional information is information that presents an image forming apparatus that is alternatively available.

5. The image forming apparatus according to claim 2, wherein the additional information is information that presents a power restoration estimation time.

6. The image forming apparatus according to claim 1,
   further comprising a power off unit configured to turn off the power of the image forming apparatus, in a state in which a controller of the image forming apparatus is powered, in accordance with an instruction of a user,
   wherein the controller turns off the power of the image forming apparatus after controlling the presentation unit to present to the user information indicating that the turning off of the power is due to the electric power control signal when the electric power control signal is received by the reception unit in a state where the power is turned off by the power off unit.

7. An image forming apparatus capable of connecting to a network, comprising:
   a reception unit configured to receive via the network an electric power control signal for instructing electric power control;

a shutdown unit configured to turn off a power of the image forming apparatus in accordance with the electric power control signal received by the reception unit;

a storage unit configured to store information for indicating that the power of the image forming apparatus is turned off due to the electric power control signal;

a determination unit configured to determine, in a case where, after the power of the image forming apparatus was turned off, the image forming apparatus is started up, whether or not the information is stored in the storage unit; and a control unit configured to control, in a case where it is determined, by the determination unit, that the information is not stored, so as to start up the image forming apparatus in a first power state, and to control, in a case where it is determined, by the determination unit, that the information is stored, so as to start up the image forming apparatus in a second power state having greater conservation of power than the first power state.

8. The image forming apparatus according to claim 7, wherein the image forming apparatus is started up by a power switch of the image forming apparatus being turned on.

9. The image forming apparatus according to claim 7, wherein the electric power control signal is transmitted to the network in a case where an electric power consumption amount became within a predetermined amount from an electric power amount for which supply is possible.

10. The image forming apparatus according to claim 7, wherein the control unit, in the second power state, supplies power to at least a display unit of the image forming apparatus and causes a message indicating that the power of the image forming apparatus cannot be turned on to display on the display unit.

11. The image forming apparatus according to claim 10, wherein the electric power control signal includes information of a scheduled time at which the electric power control will be cancelled, and the message includes information of the scheduled time.

12. The image forming apparatus according to claim 7, wherein the second power state is a state in which power is supplied to an operation unit of the image forming apparatus but power is not supplied to at least a printer unit.

13. The image forming apparatus according to claim 7, further comprising:

a query unit configured to make a query, in a case where it is determined by the determination unit that the information has been stored, to a dispatch origin of the electric power control signal as to whether or not the electric power control signal has been cancelled wherein the control unit controls so as to start up the image forming apparatus in the second power state in a case that a reply to the query by the query unit indicates the electric power control signal has not been cancelled, and start up the image forming apparatus in the first power state in a case that a reply to the query by the query unit indicates the electric power control signal has been cancelled.

14. A method of controlling an image forming apparatus capable of connecting to a network, the control method comprising:

receiving via the network an electric power control signal for instructing electric power control;

turning off a power of the image forming apparatus in accordance with the electric power control signal received in the receiving; and presenting, to a user, information indicating that the image forming apparatus entered a power off state due to the electric power control signal, wherein the information is presented to the user by a printed material in the presenting.

15. A method of controlling an image forming apparatus capable of connecting to a network, the method comprising:

receiving via the network an electric power control signal for instructing electric power control;

turning off a power of the image forming apparatus in accordance with the electric power control signal received in the receiving; and storing, in a memory, information indicating the power of the image forming apparatus is turned off due to the electric power control signal;

determining whether or not the information is stored in the memory in a case where after the power of the image forming apparatus was turned off the image forming apparatus is started up;

controlling, in a case where it is determined, in the determining, that the information is not stored in the memory, so as to start up the image forming apparatus in a first power state, and controlling, in a case where it is determined, in the determining, that the information is stored in the memory, so as to start up the image forming apparatus in a second power state having greater conservation of power than the first power state.

16. A non-transitory computer-readable storage medium storing a program for causing a computer to execute a control method of controlling an image forming apparatus capable of connecting to a network, the method comprising:

receiving via the network an electric power control signal for instructing electric power control;

turning off a power of the image forming apparatus in accordance with the electric power control signal received in the receiving; and presenting, to a user, information indicating that the image forming apparatus entered a power off state due to the electric power control signal, wherein the information is presented to the user by a printed material in the presenting.

* * * * *